United States Patent [19]

Chiu

[11] Patent Number: 4,875,030
[45] Date of Patent: Oct. 17, 1989

[54] SLEEP-PREVENTING ALARM DEVICE

[76] Inventor: Shui W. Chiu, 3 Fl., No. 30, Lane 60, Swang Yuan St., Taipei, Taiwan

[21] Appl. No.: 322,109

[22] Filed: Mar. 13, 1989

[51] Int. Cl.$^4$ .............................................. G08B 23/00
[52] U.S. Cl. ................................................... 340/575
[58] Field of Search ................ 340/575, 576; 180/272

[56] References Cited

U.S. PATENT DOCUMENTS 2,726,380 12/1955 Campisi ............................ 340/575
4,144,531 3/1979 Anbergen .......................... 340/575

*Primary Examiner*—Joseph A. Orsino
*Assistant Examiner*—Frank M. Scutch, III
*Attorney, Agent, or Firm*—Bacon & Thomas

[57] ABSTRACT

A sleep-preventing device incorporated within a pair of glasses having a light emitting diode, a photo diode, a buzzer, a power source and a printed circuit board. The printed circuit board is electrically connected to the light emitting diode, the photo diode, the buzzer. The photo diode is lodged in the bridge of the glasses and protrudes from a nosepiece of the glasses. An earpiece of the glasses has a cavity to receive the printed circuit board and the light emitting diode. An opening of the cavity is covered by a plate and a cover on which the printed circuit board is disposed. The plate has a number of holes to receive the light emitting diode, in which bores of the holes are oriented towards the photo diode so that the photo diode receives the light from the light emitting diode.

1 Claim, 3 Drawing Sheets

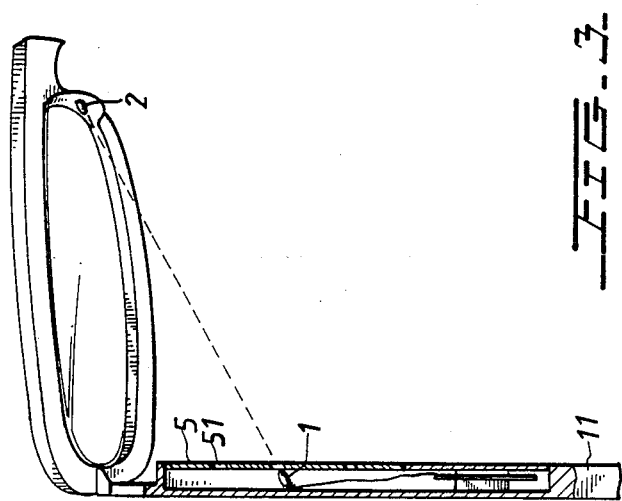

SLEEP-PREVENTING ALARM DEVICE

BACKGROUND OF THE INVENTION

The present invention relates to a sleep-preventing alarm device which can be worn by a user who must concentrate his attention at every moment, such as a vehicle operator, to prevent him from falling asleep. More particularly, the present invention relates to a sleep-preventing alarm device, which is incorporated within a pair of glasses, wherein an LED (light emitting diode) of the alarm device is provided in an earpiece of the glasses and is adjustable therealong in order to match the contour of the user's face.

Heretofore, various kinds of the sleep-preventing alarm devices have been developed in many parts of the world. It is also known to incorporate such sleep-preventing alarm devices in general glasses to detect the shut-down of the eyelids of the user while he/she has to pay attention to what he is doing; e.g., truck driving, and so on. However, the users often experienced problems while wearing such a pair of glasses due to the different contours of their faces, since the alarm device was not adjustable on the glasses and the position of the LED was not suited to everybody.

It is the purpose of this present invention, therefore, to mitigate and/or obviate the above-mentioned drawback in the manner set forth in the detailed description of the preferred embodiment.

SUMMARY OF THE INVENTION

A primary objective of this invention is to provide a sleep-preventing alarm device incorporated within a pair of glasses and carried by the user to produce sound and prevent from nodding or falling asleep, by detecting extended shutting of the eyelids of the user.

Another objective of this invention is to provide a sleep-preventing alarm device, in which the position of the LED of the alarm provided in an earpiece of the glasses is adjustable.

Further objectives and advantages of the present invention will become apparent as the following description proceeds, and the features of novelty which characterize the invention are pointed out with particularity in the claims annexed to and forming a part of this invention.

BRIEF DESCRIPTION OF THE DRAWINGS

FIG. 3 is a partial cross-sectional view of the glasses, showing that the axis of each one of the holes on the plate is oriented towards the photo diode in accordance with the invention.

DETAILED DESCRIPTION OF PREFERRED EMBODIMENTS

Figure 1:
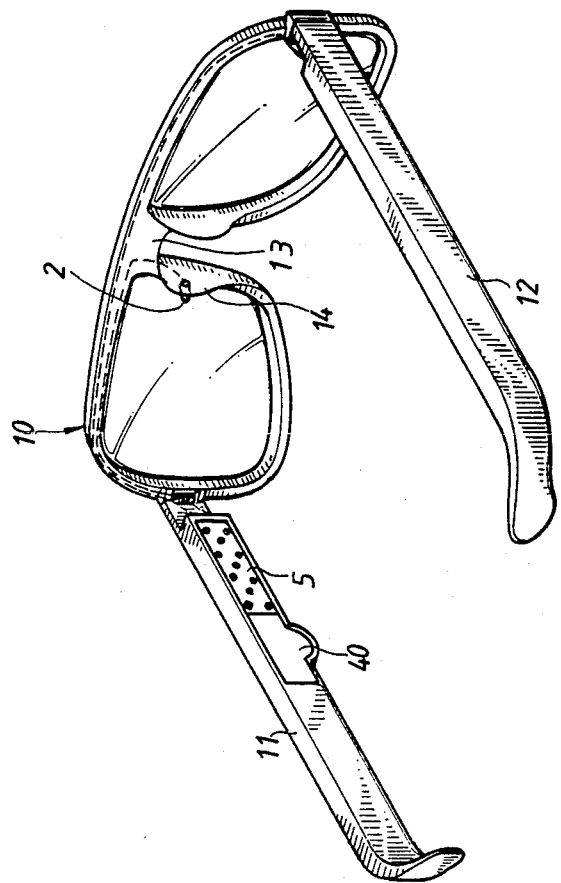
FIG. 1 is a perspective view of a sleep-preventing alarm device incorporated within a pair of glasses in accordance with a preferred embodiment of present invention.
Figure 2:
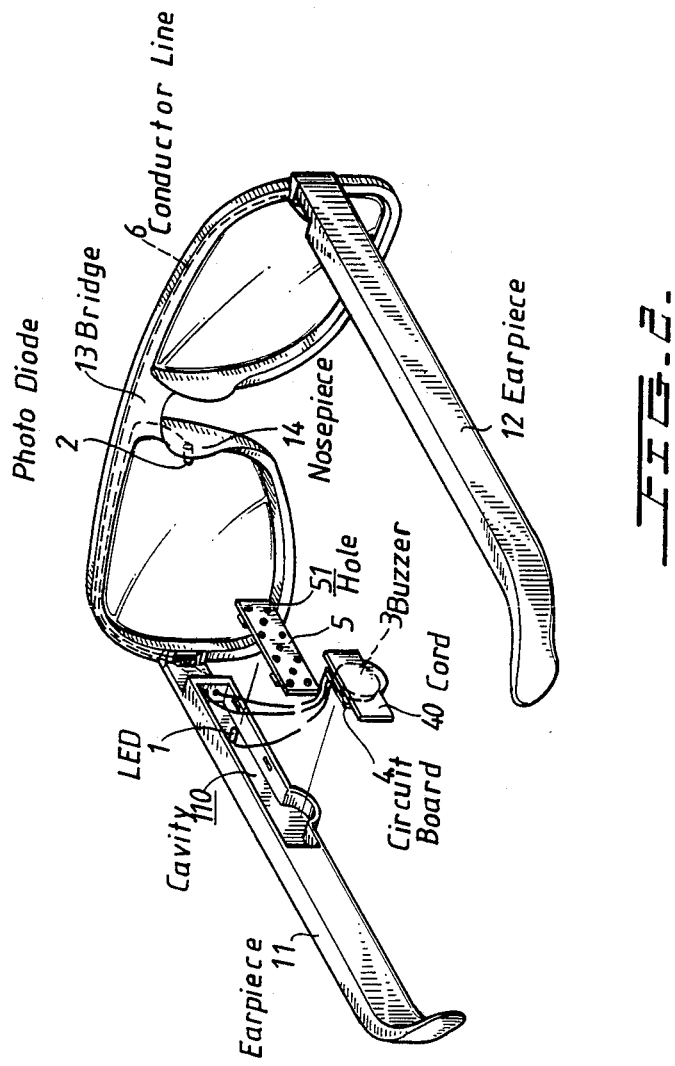
FIG. 2 is a perspective view similar to FIG. 1, but showing the cover and the plate detached from the earpiece of the glasses.

With reference to the drawings and particularly to FIGS. 1 and 2, it can be seen that a sleep-preventing alarm device is incorporated within a pair of glasses 10 in accordance with the present invention. The alarm device comprises an ever-shining LED (light emitting diode) 1, a photo diode 2, a buzzer 3, and a printed circuit board 4 which is electrically connected to the LED 1, the photo diode 2 and buzzer 3. An earpiece 11 of the glasses 10 has a cavity 110 to receive the LED 1 and the printed circuit board 4. The opening of the cavity 110 is covered with a cover 40 and a plate 5. The printed circuit board 4 is fixedly mounted on the cover 40 and the plate 5 has a plurality of holes 51 to receive the LED 1. The alarm device further comprises a power source with a switch (not shown) which is provided on the other earpiece 12 of the glasses 10 to supply power to the printed circuit board via a conductor line 6. As is common in conventional sleep-preventing devices, the shut-down of the eyelids is detected by the photo diode 2 which receives the emission from the LED 1. Since the technology and construction of the LED 1, the photo diode 2 and the buzzer 3 are well-known in the art, further discussion and description are not considered necessary at this time.

It should be noted a normal blink usually causes no more than 0.3 milliseconds of stay of the eyelashes at its lowest position where the beam passes. Thus such a transient interruption of illumination on the photo diode 2 does not cause any response. However, if the break of illumination exceeds the upper limit of the time of a human's natural blink, the alarm device will be triggered to actuate the buzzer 3 to produce an acoustic alarm.

The buzzer 3, shown in dotted lines in FIG. 2, is mounted on the printed circuit board 4 on which a triggering circuit is provided to actuate the buzzer 3. The photo diode 2 is lodged in the bridge 13 of the glasses 10 and the capsule of the photo diode 2 protrudes from a nosepiece 14 of the glasses 10 to face toward the LED 1 which is disposed within one of the holes 51, as mentioned before. The position of the LED 1 is adjustable, since it can be received in any one of the holes 51 and protrude therefrom. The bores of all the holes 51 are oriented at a slant to the plate 5 in the direction of the photo diode 2. Thereby, the LED 1 in each hole 51 is oriented to the photo diode 2, as shown in FIG. 3.

As various possible embodiments might be made of the above invention without departing from the scope of the invention, it is to be understood that all matter herein described or shown in the accompanying drawing is to be interpreted as illustrative and not in a limiting sense. Thus it will be appreciated that the drawings are exemplary of a preferred embodiment of the invention.

I claim:

1. A sleep-preventing alarm device incorporated within a pair of glasses comprising a light emitting diode, a photo diode, a buzzer, a power source and a printed circuit board electrically connected to said light emitting diode, said photo diode and said buzzer;

said photo diode being lodged in a bridge of said glasses with a capsule portion of said photo diode protruding from a nosepiece of said glasses;

an earpiece of said glasses having a cavity to receive said printed circuit board and said light emitting diode therein; an opening of said cavity being covered by a cover and a plate; and said printed circuit board being fixedly mounted on said cover; said plate having a plurality of holes to receive said light emitting diode, said holes being oriented at a slant to said plate in a direction of said photo diode.

* * * * *